(12) United States Patent
Zambetti

(10) Patent No.: US 7,246,988 B1
(45) Date of Patent: Jul. 24, 2007

(54) CHRISTMAS TREE TIE DOWN SYSTEM

(76) Inventor: John R. Zambetti, 178 Commission St., Southington, CT (US) 06489

( * ) Notice: Subject to any disclaimer, the term of this patent is extended or adjusted under 35 U.S.C. 154(b) by 32 days.

(21) Appl. No.: 11/243,211

(22) Filed: Oct. 4, 2005

(51) Int. Cl.
*B60P 7/08* (2006.01)
(52) U.S. Cl. .......... 414/809; 410/37; 410/47; 410/97; 410/98; 410/100
(58) Field of Classification Search ........ 410/37, 410/47, 50, 96–100; 224/318, 324, 546, 224/563, 568, 572; 24/68 CD, 302, 265 CD; 414/809; 248/499
See application file for complete search history.

(56) References Cited

U.S. PATENT DOCUMENTS 2,947,514 A * 8/1960 Goss ............ 410/37
5,590,775 A 1/1997 Moore
D410,224 S 5/1999 Landy
6,230,951 B1 5/2001 Anderson
6,244,482 B1 6/2001 Gyarmaty
6,892,912 B1 5/2005 MacNeil

* cited by examiner

*Primary Examiner*—Stephen Gordon
(74) *Attorney, Agent, or Firm*—Sturm & Fix LLP

(57) ABSTRACT

The present invention provides a system for easily, safely, and securely tying down a Christmas tree to the roof top of any vehicle. The system allows the tree to be secured to the vehicle in minutes by using a cable tie system which adjust to any vehicle. The system includes a central loop attached to the tree trunk, a pair of lines extending out from the sides of the central loop, and a pair of outboard loops that operably attach to the vehicle. The outboard loops attach directly to the rails of a roof rack, or to each other in the interior of the vehicle if the vehicle has no roof rack. When the tree arrives at its destination, only the central loop and outboard loops need to be cut to remove the tree from the roof top.

6 Claims, 5 Drawing Sheets

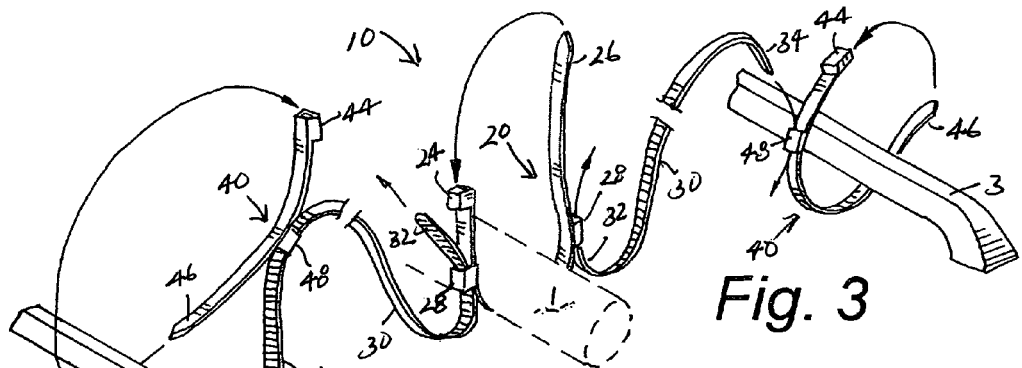
Fig. 3
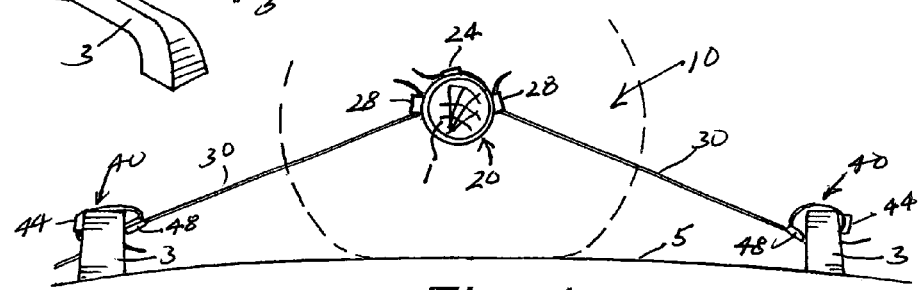
Fig. 4
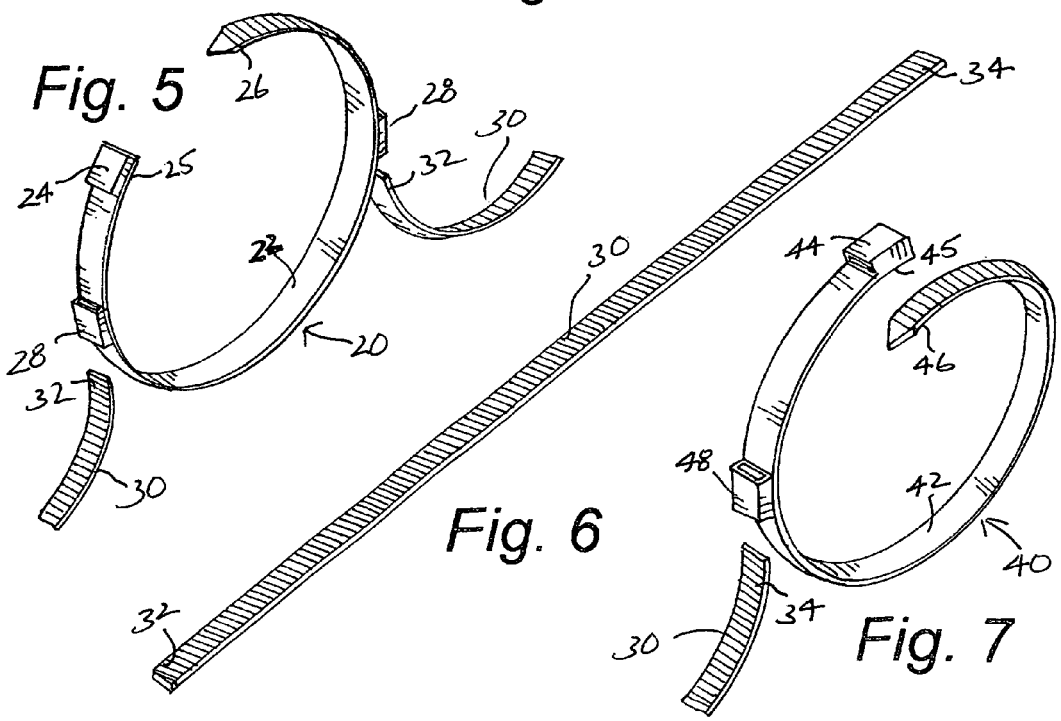
Fig. 5
Fig. 6
Fig. 7

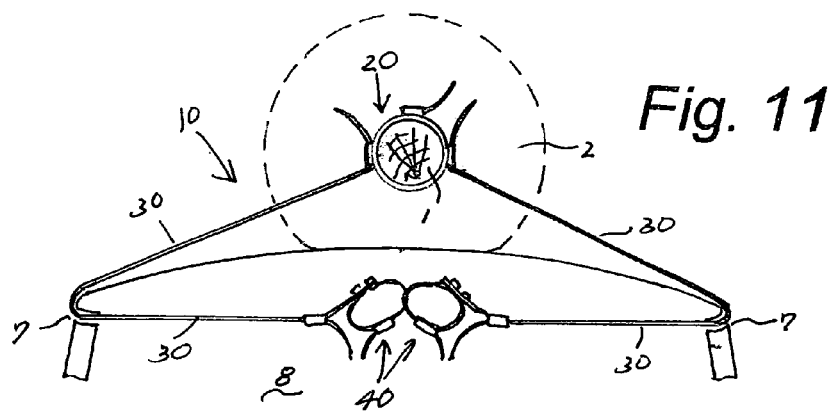
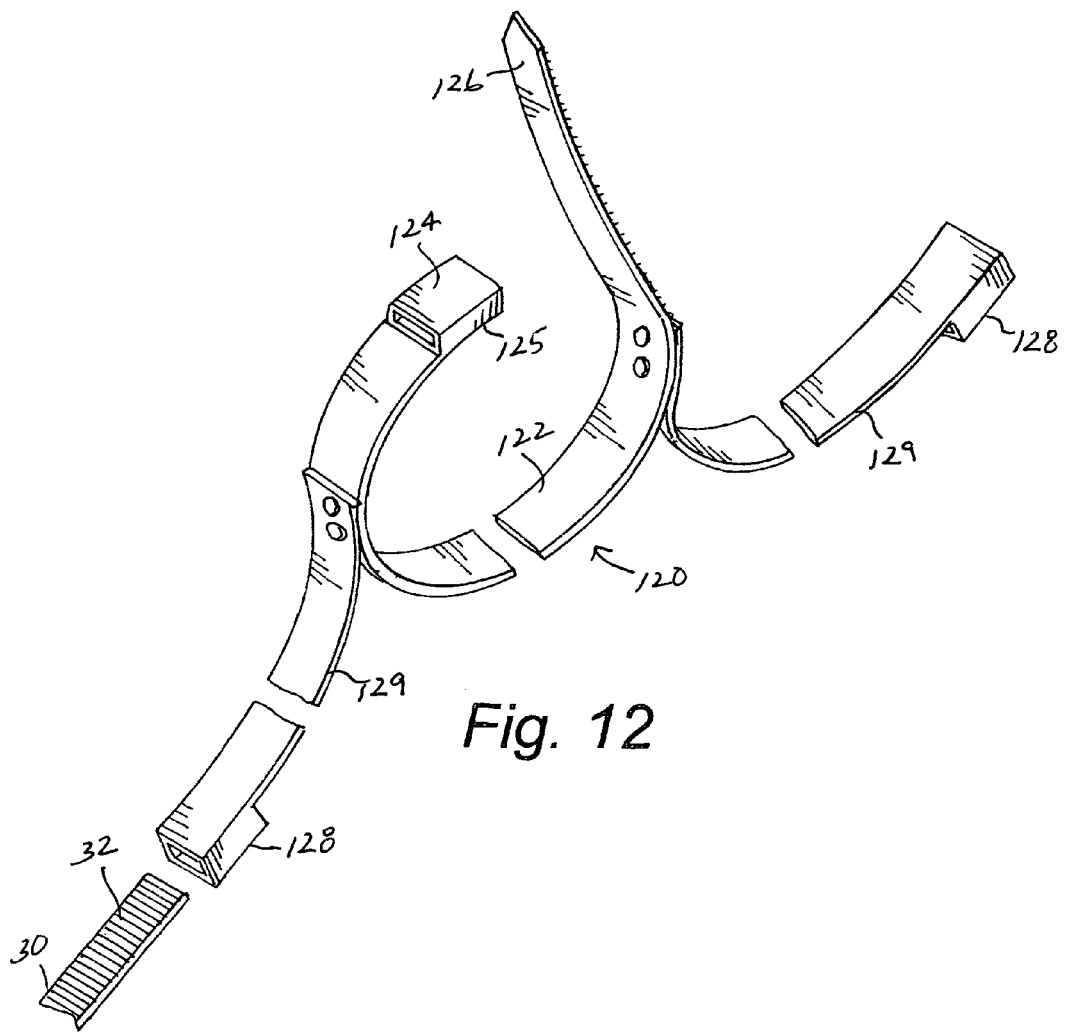

CHRISTMAS TREE TIE DOWN SYSTEM

BACKGROUND OF THE INVENTION

1. Field of the Invention

The present invention relates to the field of vehicle cargo transporting accessories, and more particularly to a Christmas tree tie down system for securing a tree to the roof top of a vehicle.

2. Description of Related Art

For every real Christmas tree sold, the consumer has the dilemma of how to safely transport the tree home. This not only causes problems for the people who do purchase a real tree but, also prevents just as many from buying one. When a tree is bought, it is usually put on the top of a vehicle which needs to have a roof rack. The tree is then secured to the top of the vehicle by tying it to the roof rack using twine supplied by the tree retailer. The consumer then has the time consuming headache and worry of trying to safely tie the tree to the vehicle, so it won't fall off during transit. When the tree arrives home, they have the pleasure of trying to untie the tree from the vehicle with hopes their roof isn't damaged from the tree's branches.

As can be seen by reference to the following U.S. Pat. Nos. 6,244,482; 6,892,912; Des. 410,224; 6,230,951; and 5,590,775, the prior art is replete with myriad and diverse vehicle cargo transporting accessories.

While all of the aforementioned prior art constructions are more than adequate for the basic purpose and function for which they have been specifically designed, they are uniformly deficient with respect to their failure to provide a simple, efficient, and practical Christmas tree tie down system.

As a consequence of the foregoing situation, there has existed a longstanding need for a new and improved Christmas tree tie down system, and the provision of such a construction is a stated objective of the present invention.

BRIEF SUMMARY OF THE INVENTION

Briefly stated, the present invention provides a system for easily, safely, and securely tying down a Christmas tree to the roof top of any vehicle. The system allows the tree to be secured to the vehicle in minutes by using a cable tie system which adjusts to any vehicle. The system includes a central loop attached to the tree trunk, a pair of lines extending out from the sides of the central loop, and a pair of outboard loops that operably attach to the vehicle. The outboard loops attach directly to the rails of a roof rack, or to each other in the interior of the vehicle if the vehicle has no roof rack. When the tree arrives at its destination, only the central loop and outboard loops need to be cut to remove the tree from the roof top.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 3 is an exploded perspective view showing the central loop, the outboard loops, and the connecting lines;

FIG. 4 is a front elevational view showing the connection of the tie down system to the tree and the rails of a roof rack;

FIG. 5 is an enlarged perspective view of the central loop with ends of the connecting lines positioned to be fed into the pair of one way locking mechanisms on the central loop;

FIG. 6 is an enlarged perspective view of one of the connecting lines;

FIG. 7 is an enlarged perspective view of one of the outboard loops with an end of one of the connecting lines positioned to feed into the one way locking mechanism;

FIG. 11 is a front elevational view showing the connection of the tie down system to the tree where the vehicle has no roof rack and the connecting lines extend through the window openings to the interior of the vehicle where the outboard loops are attached to each other;

FIG. 12 is an enlarged perspective view showing an alternate embodiment of the central loop;

DETAILED DESCRIPTION OF THE INVENTION

Figure 1:
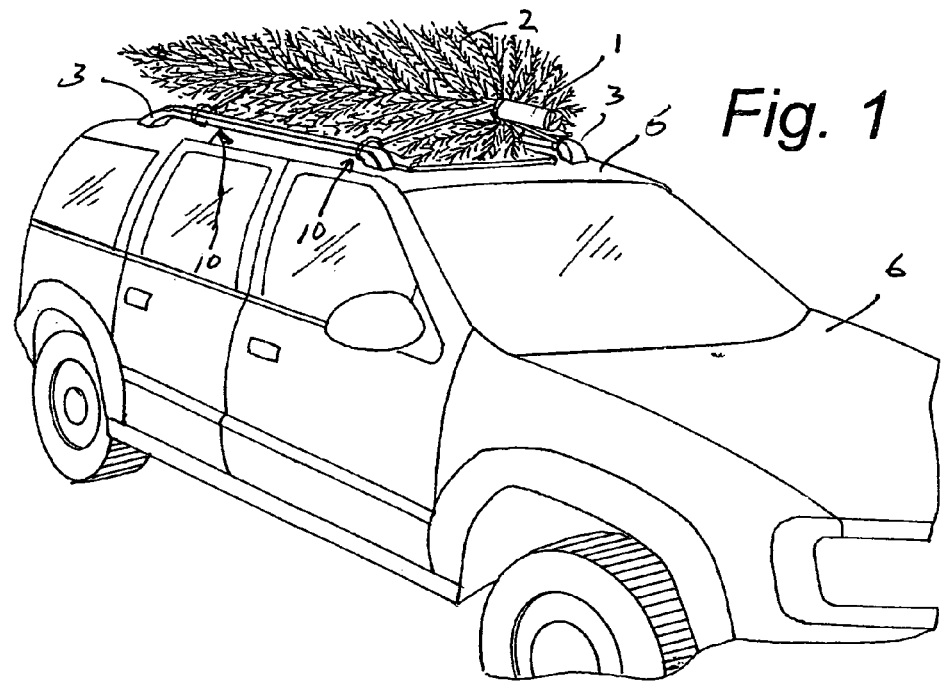
FIG. 1 is a perspective view of the tie down system of the present invention used to transport a Christmas tree on the roof top of a vehicle having a roof rack.
Figure 2:
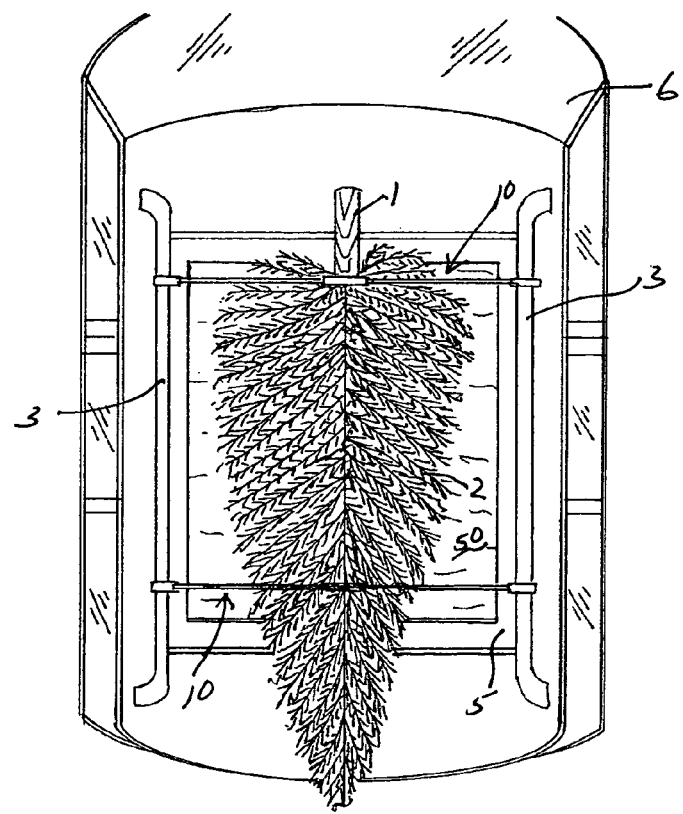
FIG. 2 is a top plan view thereof.
Figure 8:
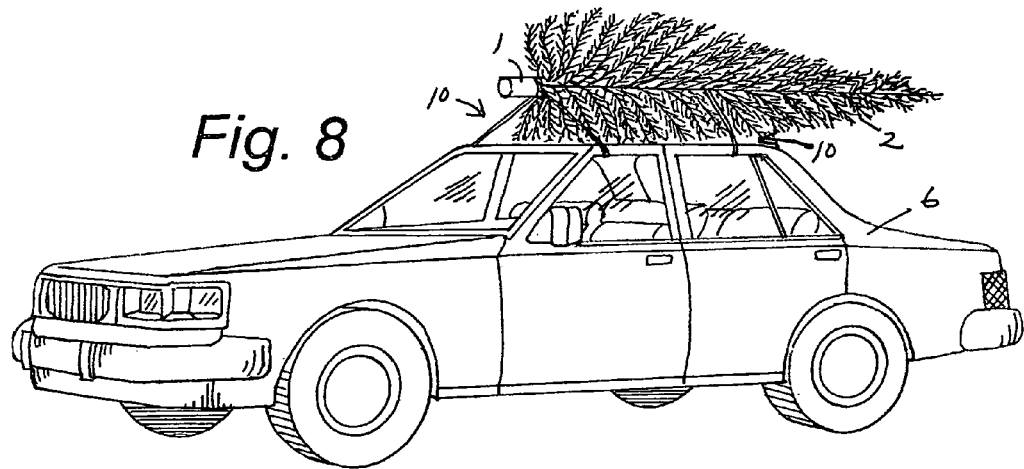
FIG. 8 is a perspective view of the tie down system used on a vehicle not having a roof rack.
Figure 9:
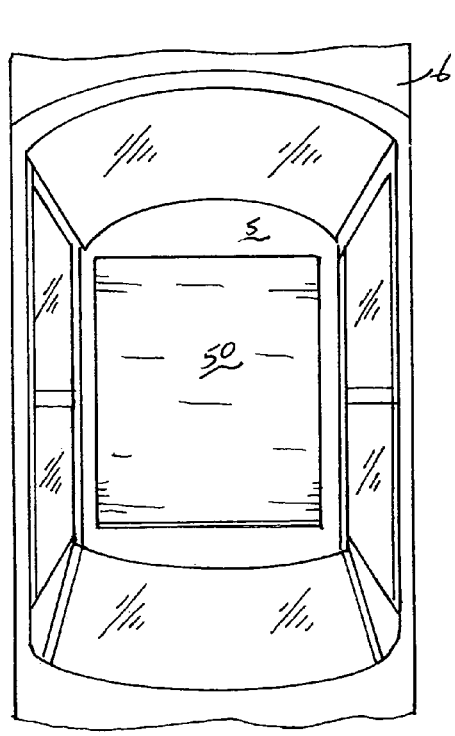
FIG. 9 is a top plan view showing a plastic disposal bag in the unopened mode positioned on the rooftop of a vehicle.
Figure 10:
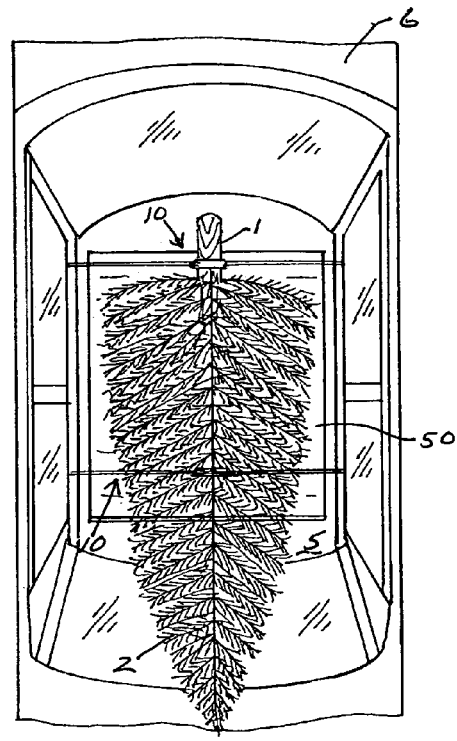
FIG. 10 is a top plan view showing the tree on the plastic bag and the tie down system secured to the top and bottom sections of the tree trunk.

As can be seen by reference to the drawings, and in particular to FIGS. 1-3, the Christmas tree tie down system that forms the basis of the present invention is designated generally by the reference number 10.

As best shown in FIGS. 3-7, the tie down system 10 includes a central loop 20, connecting lines 30, and outboard loops 40. The central loop 20 (FIG. 5) is formed of a cable tie 22 having a one way locking mechanism 24 at one end 25 and a second end 26 that is received in and pulled through the locking mechanism 24 to secure the central loop 20 around the trunk 1 of the tree 2 (FIGS. 3-4). The central loop 20 also carries an additional pair of locking mechanisms 28 disposed to receive one end 32 of the connecting lines 30. The outboard loops 40 (FIG. 7) are formed of a cable tie 42 having a one way locking mechanism 44 at one end 45 and a second end 46 that is received in and pulled through the locking mechanism 44 to secure the outboard loops 40 to the rails 3 of a roof rack attached to the roof top 5 of a vehicle 6. (FIGS. 3-4). Each outboard loop 40 also carries an additional locking mechanism 48 disposed to receive the outboard end 34 of the connecting lines 30.

It is to be understood that the central loop 20, the connecting lines 30, and the outboard loops 40 can be of varying designs. FIG. 12 shows an alternate embodiment of a central loop 120 formed of a cable tie 122 with a one way locking mechanism 124 at one end 125 and a second end 126 that is pulled through the locking mechanism 124 to secure the central loop 120 to the tree 2. The central loop 120 also carries an additional pair of locking mechanisms 128 attached by connectors 129.

The tie down system 10 may be used to secure a Christmas tree to the roof top 5 of a vehicle 6. FIGS. 1-4 illustrate the tie down system 10 used with a vehicle 6 having a roof rack with side rails 3, and FIGS. 8-11 illustrate the tie down system 10 used on a vehicle 6 not having a roof rack.

Figure 13:
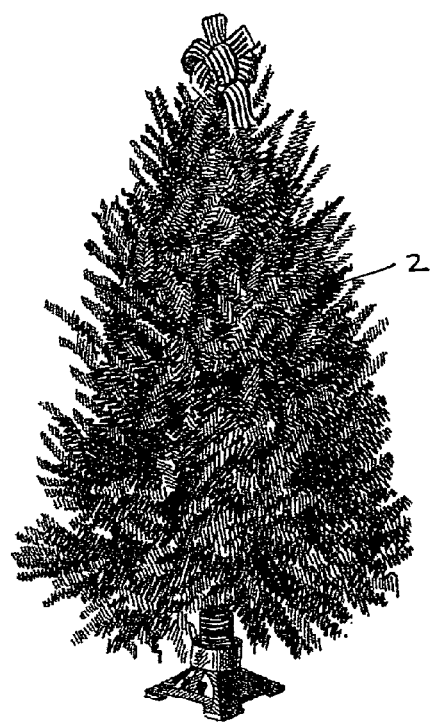
FIG. 13 is a perspective view of the tree in use.
Figure 14:
FIG. 14 is a perspective view of the tree after use being placed in the plastic bag in the opened mode.
Figure 15:
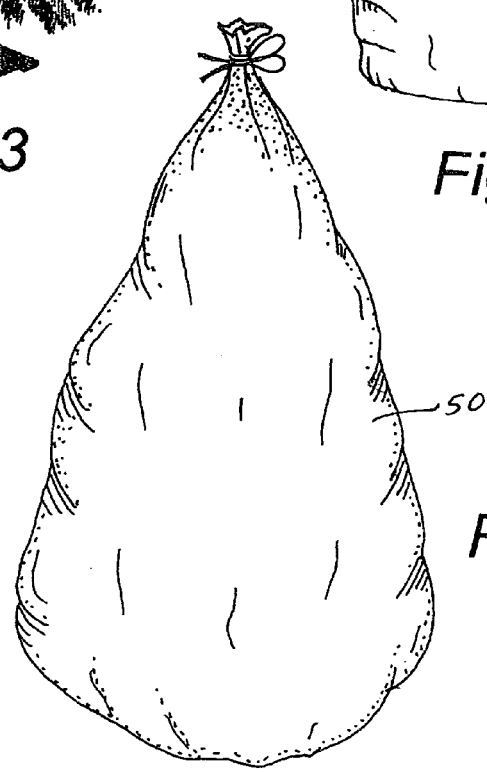
FIG. 15 is a perspective view of the tree in the plastic bag ready for disposal.

In use, the tie down system 10 may be preassembled with the connecting lines 30 attached to and interconnecting the central loop 20 and the outboard loops 40. A plastic disposal bag 50 (FIG. 2) in its unopened mode is placed on the vehicle roof top 3 to prevent the tree 2 from scratching the vehicle. The tree 2 is then positioned on the roof top 5, and the central loop 20 is secured to a lower section of the tree trunk 1 just above the lower limbs to prevent the tree 2 from sliding front to back in transit. The outboard loops 40 are then secured to the rails 3 of the roof rack on both sides of the tree 2. The connecting lines 30 are then pulled tight securing the tree 2 to the roof top 5 of the vehicle 6. A second tie down system 10 is then attached to the upper section of the tree trunk 1 using the same procedure. To release the tree 2 from the vehicle 6, the outboard loops 40 are cut and the tree 2 is unloaded. After the tree 2 is used, it is placed in the plastic bag 50 in the open mode for safe disposal (FIGS. 13-15).

In use on a vehicle 6 without a roof rack (FIGS. 8-11), the procedure is identical except that the connecting lines 30 extend through window openings 7 of the vehicle 6, and the outboard loops 40 are connected to each other.

The tie down system 10 of the present invention is useful for easily, safely, and securely tying down a Christmas tree 2 to any vehicle 6. The system 10 allows a tree 2 to be secured to a vehicle 6 in minutes by using a cable tie system which quickly adjusts to any vehicle 6, with or without a roof rack. The system 10 is simply attached and pulled tight. It is simple to use, saves time, and eliminates all questions and transit worry. When the tree 2 arrives at its destination, it is simply cut loose and is ready for set up. The disposal bag 50 protects the vehicle roof top 5 and provides for tree disposal for easy clean up after use.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A method of transporting a Christmas tree on a roof top of a vehicle, comprising the steps of:
   securing a first central loop to a first section of a trunk of the tree;
   attaching a first end of each of a pair of first lines to the first central loop;
   attaching a second end of each of the pair of first lines to first outboard loops; and
   operably attaching each of the first outboard loops to the vehicle.

2. The method of claim 1 further including the steps of:
   positioning a plastic disposal bag in an unopened mode on the roof top of the vehicle;
   positioning the tree on the bag.

3. The method of claim 1 further including the steps of:
   securing a second central loop to a second section of the trunk of the tree;
   attaching a first end of each of a pair of second lines to the second central loop;
   attaching a second end of each of the pair of second lines to second outboard loops; and
   operably attaching each of the second outboard loops to the vehicle.

4. The method of claim 3 wherein the first section of the trunk of the tree is located at a lower portion of the tree above a set of lower branches, and the second section of the trunk of tree is located at an upper portion of the tree.

5. The method of claim 2 further including the steps of:
   placing the tree in the plastic disposal bag in an opened mode after use of the tree; and
   disposing of the tree in the bag.

6. The method of claim 4 further including the steps of:
   cutting the first and second central loops, and first and second outboard loops; and
   removing the tree from the roof top of the vehicle.

* * * * *